(12) United States Patent
Koo et al.

(10) Patent No.: US 11,342,771 B2
(45) Date of Patent: May 24, 2022

(54) AUTOMATIC POWER SUPPLY CONTROL DEVICE BATTERY MANAGEMENT SYSTEM AND AUTOMATIC POWER SUPPLY CONTROL METHOD OF THE SAME

(71) Applicant: Misum Systech Co., Ltd., Anyang-si (KR)

(72) Inventors: Bong Jun Koo, Gunpo-si (KR); Jung Seop Kim, Anyang-si (KR); Jong Hak Jung, Gunpo-si (KR); Min Su Chung, Seoul (KR)

(73) Assignee: MISUM SYSTECH CO., LTD., Anyang-si (KR)

( * ) Notice: Subject to any disclaimer, the term of this patent is extended or adjusted under 35 U.S.C. 154(b) by 72 days.

(21) Appl. No.: 17/065,710

(22) Filed: Oct. 8, 2020

(65) Prior Publication Data

US 2021/0242700 A1 Aug. 5, 2021

(30) Foreign Application Priority Data

Jan. 30, 2020 (KR) .......................... 10-2020-0010818

(51) Int. Cl.
*H02J 7/00* (2006.01)
*H01M 10/42* (2006.01)

(52) U.S. Cl.
CPC ......... *H02J 7/0063* (2013.01); *H01M 10/425* (2013.01); *H02J 7/0068* (2013.01);
(Continued)

(58) Field of Classification Search
CPC .... H02J 7/0063; H02J 7/0068; H02J 2207/20; H02J 7/0048; H01M 2010/4271;
(Continued)

(56) References Cited

U.S. PATENT DOCUMENTS 4,691,801 A * 9/1987 Mann ...................... B60R 25/24
340/426.12
7,449,259 B2 * 11/2008 Zhu .......................... H02J 7/34
429/422

(Continued)

FOREIGN PATENT DOCUMENTS

| CN | 113859047 A | * | 12/2021 | |
|---|---|---|---|---|
| KR | 1036061 B1 | * | 5/2011 | .......... H01M 10/482 |
| KR | 0114757 A | * | 9/2021 | ................ H02J 7/00 |

*Primary Examiner* — Helen Rossoshek
(74) *Attorney, Agent, or Firm* — Lex IP Meister, PLLC

(57) ABSTRACT

An automatic power supply control device of a battery management system (BMS) includes a converter receiving power of a battery to convert the power to power needed for a load, wherein the power input from the battery is controlled by a manual control signal IGON) generated by a button operation of a user or by a controller (MCU), a manual control signal generator generating the manual control signal (IGON) for controlling the converter, a control signal conversion part configured to, when the manual control signal (IGON) is activated and a predetermined time has elapsed, transmit a signal (NIG) to the controller (MCU) and inactivate the manual control signal (IGON), and the controller (MCU) driven by output power of the converter and configured to activate a signal (MWAKEUP) for controlling the converter and control power supplied to the load when the signal (NIG) is received.

5 Claims, 3 Drawing Sheets

(52) U.S. Cl.
    CPC  *H01M 2010/4271* (2013.01); *H01M 2220/20* (2013.01); *H02J 2207/20* (2020.01)

(58) Field of Classification Search
    CPC . H01M 10/425; H01M 2220/20; Y02E 60/10; Y02T 10/70; B60L 58/40; G06F 1/3212
    See application file for complete search history.

(56) References Cited

U.S. PATENT DOCUMENTS

| | | | | |
|---|---|---|---|---|
| 8,483,899 | B2* | 7/2013 | Martin | G05D 1/028 |
| | | | | 320/109 |
| 8,552,588 | B2* | 10/2013 | Yang | H02J 7/1438 |
| | | | | 307/64 |
| 8,779,729 | B2* | 7/2014 | Shiraishi | G01R 31/382 |
| | | | | 320/155 |
| 8,816,637 | B2* | 8/2014 | Martin | B60L 53/36 |
| | | | | 320/109 |
| 10,027,889 | B2* | 7/2018 | Xu | G03B 17/56 |
| 2020/0274375 | A1* | 8/2020 | Griffiths | H02J 7/0029 |
| 2020/0324664 | A1* | 10/2020 | Kanzaki | B60L 58/12 |

* cited by examiner

AUTOMATIC POWER SUPPLY CONTROL DEVICE BATTERY MANAGEMENT SYSTEM AND AUTOMATIC POWER SUPPLY CONTROL METHOD OF THE SAME

CROSS-REFERENCE TO RELATED APPLICATION

This application claims priority to and the benefit of Korean Patent Application No. 2020-0010818, filed on Jan. 30, 2020, the disclosure of which is incorporated herein by reference in its entirety.

BACKGROUND

1. Field of the Invention

The present invention relates to a battery management system (BMS), and more particularly, to an automatic power supply control device of a BMS configured to automatically control power of a power supply device (converter) which receives power output from a battery, converts the power to power needed for various loads, and supplies the converted power, and an automatic power supply control method of the BMS.

2. Discussion of Related Art

Generally, a battery management system (BMS) serves to optimally manage a battery to improve energy efficiency and extend a lifespan thereof. That is, since the BMS monitors a voltage, a current, and a temperature of the battery to prevent excessive charging or discharging, improves the safety and reliability of the battery to improve energy efficiency, and extend a lifespan of the battery, the BMS is used in various fields including the electric vehicle field and the like.

FIG. 1 is a view illustrating a circuit configured to manually turn a converter, which receives power from a conventional battery and converts the power to power needed for a load, on/off to control an output of the convert. Referring to FIG. 1, the power supply device (converter) receives the power output from the battery, converts the power to the power needed for various loads, and supplies the converted power to the loads. However, in a case in which a remaining charge amount of the battery is low, it is necessary to cut off the power supplied to the load to prevent complete discharge which adversely affects a lifespan of the battery. Conventionally, since the power supplied to the load from the battery is manually controlled, when the power is not manually cut off, the load continuously consumes the power, and thus there is a high possibility that the battery is completely discharged so that the lifespan of the battery is adversely affected. In addition, since current consumption control of loads receiving the power from the battery is limited, there is a problem in that the battery is rapidly discharged.

RELATED ART DOCUMENT

Patent Document

Patent Document 0001: Registered Patent Publication No. 10-2007835 (Jul. 31, 2019)

SUMMARY OF THE INVENTION

The present invention is directed to providing an automatic power supply control device of a battery management system (BMS) capable of recognizing a condition of a battery to automatically control power supply for a load so as to improve energy efficiency and extend a lifespan of the battery without manually operating the BMS, and an automatic power supply control method of the BMS.

According to an aspect of the present invention, there is provided an automatic power supply control device of a battery management system (BMS) that automatically controls power supplied from a battery to a load. The device includes a converter receiving power of a battery to convert the power to power needed for a load, wherein the power input from the battery is controlled by a manual control signal (IGON), which is generated by a button operation of a user, or by a controller (MCU) of the BMS, a manual control signal generator generating the manual control signal (IGON), which is generated by the button operation of the user, for controlling driving of the converter, a control signal conversion part configured to, when the manual control signal (IGON) is activated and a predetermined time has elapsed, transmit a signal (NIG), which indicates that the manual control signal (IGON) is activated, to the controller (MCU) and inactivate the manual control signal (IGON), and the controller (MCU) driven by output power of the converter, and configured to activate a signal (MWAKEUP) for controlling the driving of the converter and to control power supplied to the load when receiving the signal (NIG) from the control signal conversion part.

The control signal conversion part may include a time delay part configured to distribute an output voltage output from the manual control signal generator and delay the distributed output voltage for the predetermined time, a first switch switched by the output voltage delayed by the time delay part to inactivate the manual control signal (IGON), and a second switch switched by the output voltage delayed by the time delay part to output the signal (NIG). The time delay part may include a voltage distribution circuit configured to distribute the output voltage output from the manual control signal generator, and a time constant circuit configured to delay output of the voltage distribution circuit for the predetermined time.

According to another aspect of the present invention, there is provided an automatic power supply control method of a battery management system (BMS) that automatically controls power (Vcc) supplied from a battery to a load. The method includes generating, by a user's switching, a manual control signal (IGON), waking, by the manual control signal (IGON), the converter up and generating power needed for a load using power of a battery, generating, by a controller (MCU), which is driven by the power generated by the converter, of the BMS, a signal (MWAKEUP) for controlling driving of the converter, inactivating the signal (IGON) among the signal (IGON) and a signal (MWAKEUP) input to the converter, and controlling, by the controller configured to control the signal (MWAKEUP), the driving of the converter.

The automatic power supply control method in a (BMS) may further include receiving, by the controller, information about a remaining charge amount of the battery from a remaining battery amount sensor configured to detect the remaining charge amount of the battery, and controlling, by the controller, the driving of the converter using the information about the remaining charge amount of the battery.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
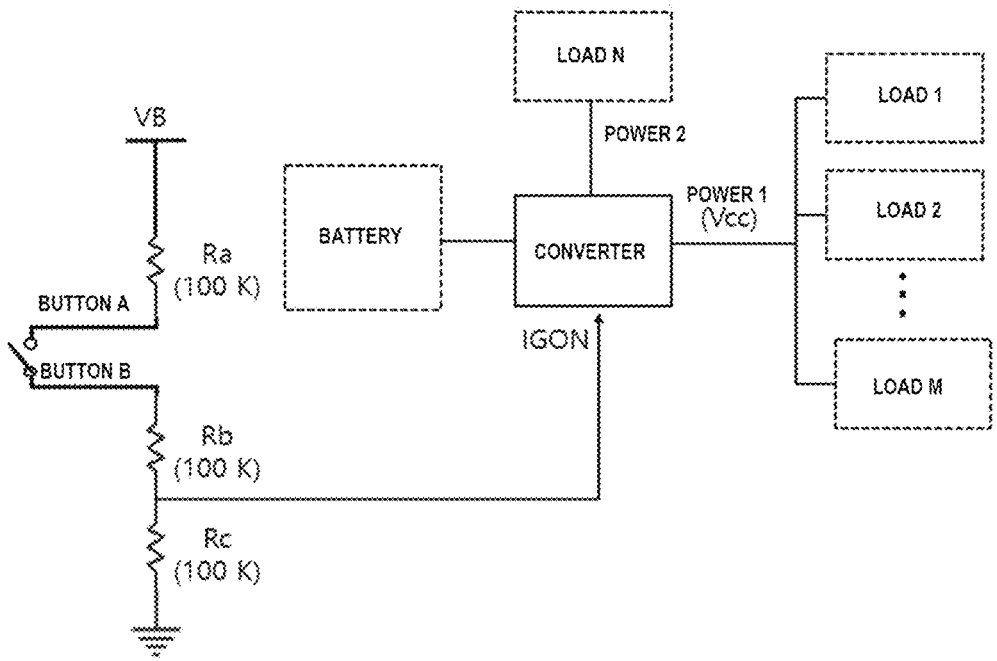
FIG. 1 is a view illustrating a circuit configured to manually turn a converter, which receives power from a conventional battery and converts the power to power needed for a load, on/off to control an output of the converter.

Hereinafter, exemplary embodiments of the present invention will be described with reference to the accompanying drawings. Since the embodiments described in this specification and configurations illustrated in the drawings are only exemplary embodiments and do not represent the overall technological scope of the invention, it should be understood that the invention covers various equivalents, modifications, and substitutions at the time of filing of this application.

Figure 2:
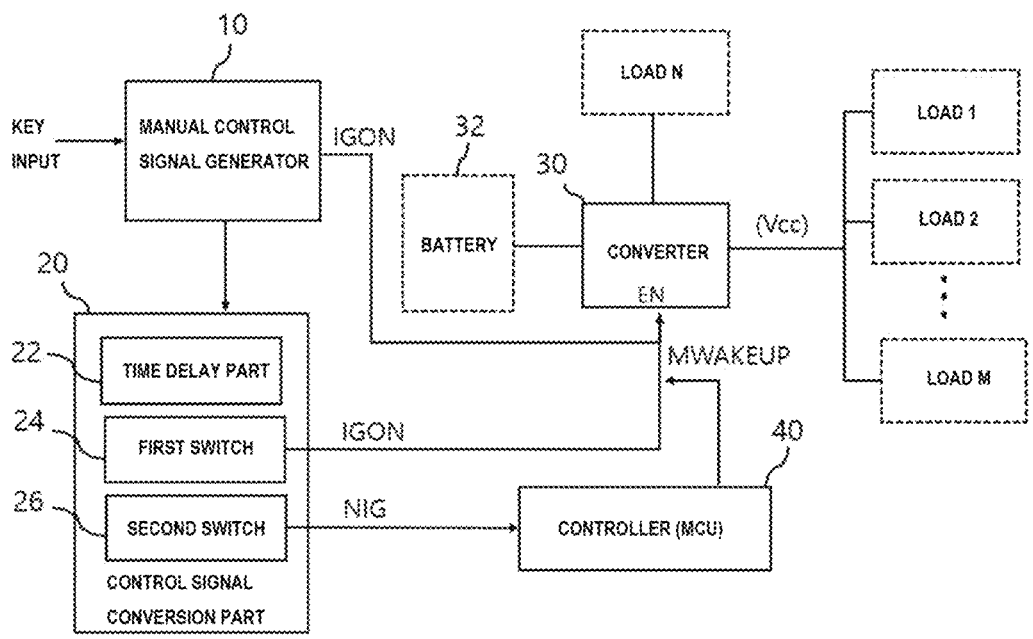
FIG. 2 is a view illustrating a block diagram of an automatic power supply control device of a battery management system (BMS) according to one embodiment of the present invention.

FIG. 2 is a view illustrating a block diagram of an automatic power supply control device of a battery management system (BMS) according to one embodiment of the present invention. In addition, FIG. 3 is a view illustrating a circuit diagram of the automatic power supply control device of the BMS according to one embodiment of the present invention.

Figure 3:
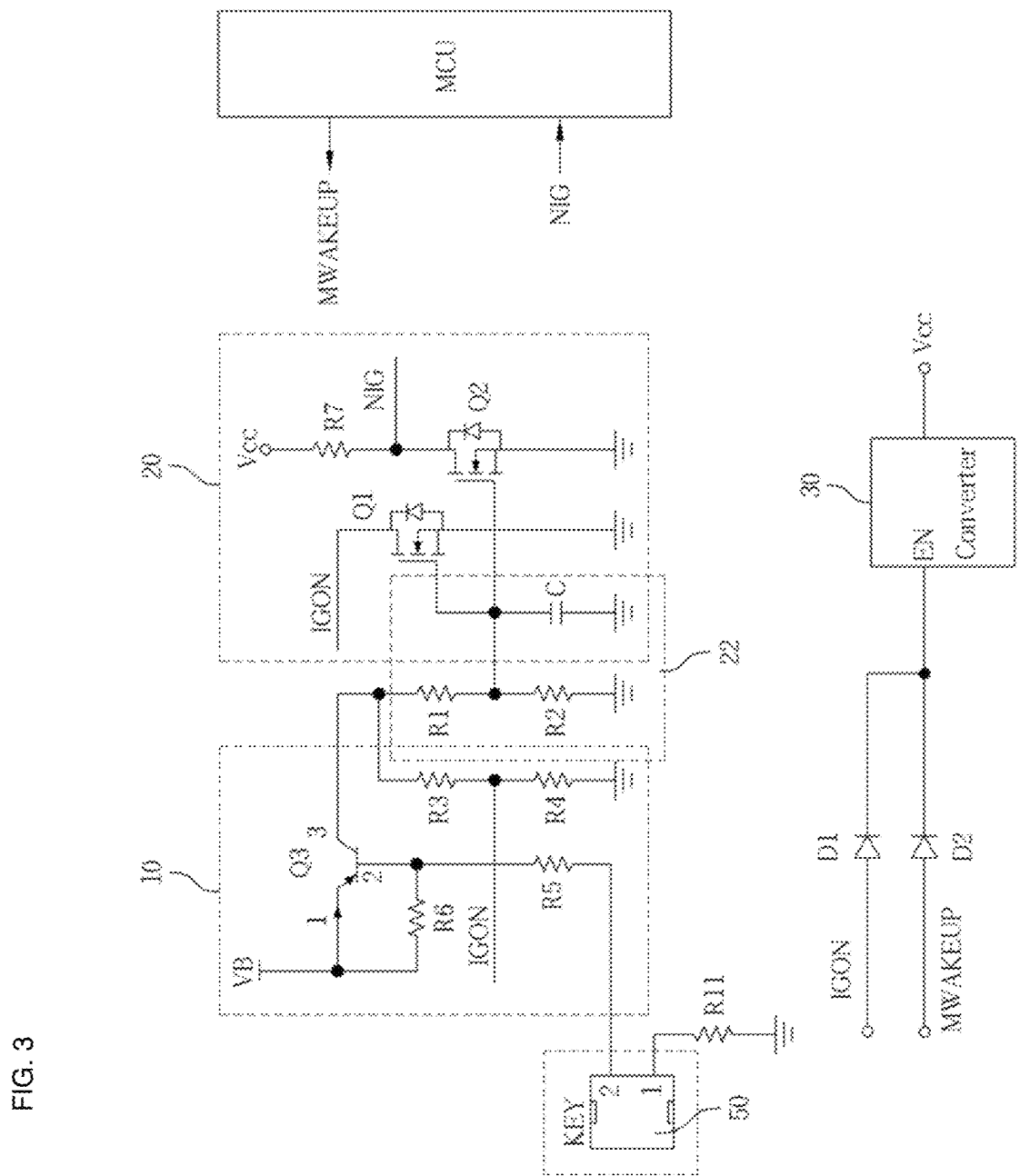
FIG. 3 is a view illustrating a circuit diagram of the automatic power supply control device of a BMS according to one embodiment of the present invention.

Referring to FIGS. 2 and 3, the automatic power supply control device of the BMS according to the present invention includes a manual control signal generator 10, a control signal conversion part 20, a converter 30, and a micro controller unit (MCU) 40.

When a button operation is performed by a user, the manual control signal generator 10 generates a manual control signal IGON for controlling the driving of the converter. The manual control signal generator 10 includes a transistor Q3 which is switched by an output of a key 50 operated by the user to output a predetermined voltage using input battery power VB.

The control signal conversion part 20, when the manual control signal IGON is activated and a predetermined time has elapsed, transmits a signal NIG, which indicates that the manual control signal IGON is activated, to the MCU 40, and inactivates the manual control signal IGON, and includes a time delay part 22, a first transistor Q1 which is a first switch 24, and a second transistor Q2 which is a second switch 26.

The time delay part 22 distributes an output voltage output from the manual control signal generator 10 and delays the distributed output voltage for a predetermined time. The predetermined time may be a time constant made by a resistor R1, a resistor R2, and a capacitor C. In this case, the time delay part 22 includes a voltage distribution circuit configured to distribute the output voltage output from the manual control signal generator 10 using the resistor R1 and the resistor R2 and a time constant circuit including a capacitor C connected to the resistor R1 in series to delay a output voltage of the voltage distribution circuit for the predetermined time.

In addition, the first transistor Q1 is switched by an output voltage output after being delayed by the time delay part 22 for the predetermined time to control the potential of the manual control signal IGON output from the manual control signal generator 10.

The second transistor Q2 is switched due to the output voltage output after being delayed by the time delay part 22 for the predetermined time to output the signal NIG for notifying that the manual control signal IGON is activated. In this case, each of the first transistor Q1 and the second transistor Q2 may be implemented using an N channel field effect transistor (NFET, 2N7002) including a gate to which the output voltage of the time delay part 22 is input.

The converter 30 receives power of a battery to convert the power to power needed for loads, and the power input from the battery is controlled due to the manual control signal IGON generated by the button operation of the user or the MCU of the BMS. That is, the converter 30 outputs power to the BMS and the battery when any one signal of the manual control signal IGON and a signal MWAKEUP, which is output from the MCU 40 to control the driving of the converter, is enabled.

In addition, the converter 30 may include an OR gate which receives the manual control signal IGON and the signal MWAKEUP, which is output from the MCU 40 to control the driving of the converter, and outputs any one of the manual control signal IGON and the signal MWAKEUP in an input terminal thereof. The OR gate may be formed as a parallel circuit including a first diode D1 of which anode receives the signal IGON and a second diode D2 of which anode receives the signal MWAKEUP.

The MCU 40 is driven using output power of the converter 30, and when the MCU 40 receives the signal NIG, which notifies that the manual control signal IGON is activated, from the control signal conversion part 20, activates the signal MWAKEUP for controlling the driving of the converter 30, and controls power supplied to the load. That is, when the signal NIG output from the control signal conversion part 20 is enabled, the MCU 40 controls the entire BMS by generating the signal MWAKEUP while receiving power from the converter 30 to be operated, and supplying stable power to the load using a built-in preset program.

Figure 4:
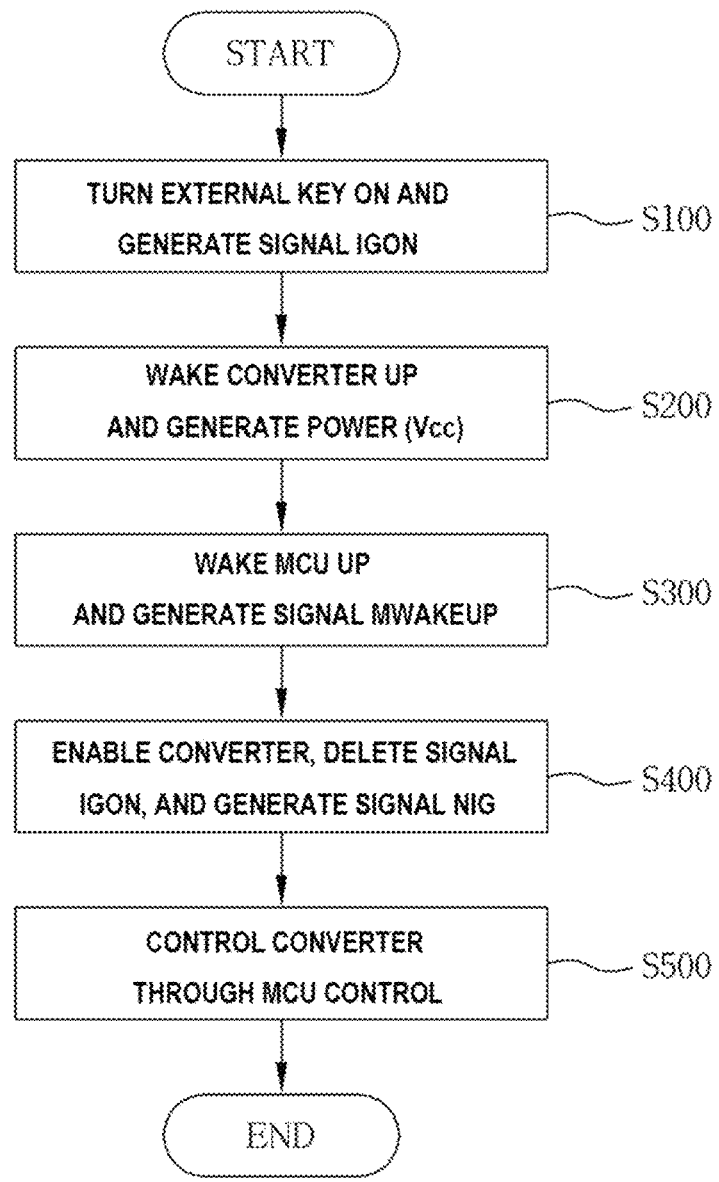
FIG. 4 is a flowchart illustrating an automatic power supply control method of a BMS according to the present invention.

FIG. 4 is a flowchart illustrating the automatic power supply control method of a BMS according to the present invention. The automatic power supply control method of the BMS and an operation of the automatic power supply control device of the BMS according to the present invention will be described with reference to FIGS. 2 to 4.

First, in the manual control signal generator 10 to which the power VB is input from a battery 32, the third transistor Q3, to which a low potential is applied as a base potential when the user operates the key 50, is turned on, the manual control signal IGON having a predetermined high level is output between the resistor R3 and the resistor R4 (S100). That is, when the user presses the key 50, the manual control signal IGON is generated by the switching of the transistor Q3. In addition, a predetermined output voltage output from the manual control signal generator 10 is distributed by the resistor R1 and the resistor R2, is delayed for a predetermined time by the time constant circuit including the resistor R1, the resistor R2, and the capacitor C.

In this case, the manual control signal IGON output between the resistor R3 and the resistor R4 of the manual control signal generator 10 is input through the first diode D1 provided in the input terminal of the converter 30, and the converter 30 is woken up by the manual control signal IGON, and power Vcc is supplied from the converter 30 (S200). When the power is output from the converter 30, the entire BMS is operated. That is, the converter 30 is woken by the manual control signal IGON, and the converter 30 generates power needed for the load using input power from the battery.

In addition, the MCU 40 receiving the power generated by the converter 30 is woken up to start to control the BMS. In addition, the manual control signal IGON output from the manual control signal generator 10 is switched by the first transistor Q1 after the predetermined time and is lowered to a low level and inactivated by the control signal conversion part 20. Before the manual control signal IGON is inactivated, the MCU 40 controls the converter 30 by enabling the converter control signal MWAKEUP input to the converter 30 through the second diode D2 (S300).

Then, in the control signal conversion part 20, the first transistor Q1, which is turned off when a low voltage is applied to the gate by the delayed output voltage of the time constant circuit, of the time delay part 22 does not affect the potential of the manual control signal IGON at all because a source and a drain are opened at an initial stage. When the first transistor Q1 is turned on by a high voltage applied to the gate after a delay for the predetermined time and is operated in a short state, since the potential of the manual control signal IGON is switched from a high level to a low level by the ground (GND) potential in the first transistor Q1, the manual control signal IGON disappears, and thus the first diode D1 of the converter 30 is not operated. The second transistor Q2, which has been in an OFF state due to an applied gate voltage the same as that applied to the first transistor Q1, is operated in a short state, and outputs the signal NIG having a low level which is a recognition signal of the signal IGON of the MCU 40 (S400).

Accordingly, the right to control the converter 30, which receives the signal MWAKEUP output by the MCU 40 instead of the manual control signal IGON, is changed from manual operation of the key 50 to the MCU 40 so that the converter 30 is no longer controlled by the manual control signal IGON but controlled by the MCU 40 (S500).

That is, since the right to control is changed from the operation of the key 50 to the MCU 40 through the above-described process so that the converter 30 automatically controls a power source to be turned off without manually operating the key 50, even when the user does not operate the key 50, power output from the converter 30, which inputs the signal NIG enabled to have a low level, is automatically controlled to be cut off by the MCU 40 so as to control the entire BMS including a cell of the battery identified by the MCU.

In addition, when the MCU 40 of the BMS receives information about a remaining charge amount of the battery from a remaining battery amount sensor (not shown) configured to detect a remaining charge amount of the battery, the MCU 40 may control the driving of the converter using the information about the remaining charge amount of the battery to reduce battery power consumption so as to prevent the battery from being completely discharged. In addition, in order to cut off power output from the battery 32, the MCU 40 may control the signal MWAKEUP such that the converter 30 does not output power.

According to an automatic power supply control device and method of a BMS according to the present invention, there is an advantage in that control of power supply according to a condition of a load is not performed by a user, and an MCU in a BMS can automatically control a battery to be turned off.

In addition, since current consumption of the battery is controllable and quick discharge is prevented, energy efficiency of the battery is improved, complete discharge of the battery is prevented, and thus there is an advantage of extending a lifespan of the battery.

The present invention has been described with reference to the embodiments illustrated in the drawings, but these are only exemplary. It will be understood by those skilled in the art that various modifications and other equivalent embodiments may be made. Therefore, the scope of the present invention is defined by the appended claims.

What is claimed is:

1. An automatic power supply control device of a battery management system (BMS) that automatically controls power supplied from a battery to a load, the device comprising:
    a converter configured to receive power of a battery to convert the power to power needed for a load, wherein input of the power from the battery to the converter is controlled by a manual control signal (IGON) or by a control signal from a controller (MCU) of the BMS;
    a manual control signal generator configured to generate the manual control signal (IGON) for controlling driving of the converter;
    a control signal conversion part configured to, when the manual control signal (IGON) is activated and a predetermined time has elapsed, transmit a signal (NIG), which indicates that the manual control signal (IGON) is activated, to the controller (MCU) and inactivate the manual control signal (IGON); and
    the controller (MCU) driven by output power of the converter and configured to activate a signal (MWAKEUP) for controlling the driving of the converter and to control power supplied to the load when receiving the signal (NIG) from the control signal conversion part.

2. The device of claim 1, wherein the control signal conversion part includes:
    a time delay part configured to distribute an output voltage output from the manual control signal generator and delay the distributed output voltage for the predetermined time;
    a first switch switched by the output voltage delayed by the time delay part to inactivate the manual control signal (IGON); and
    a second switch switched by the output voltage delayed by the time delay part to output the signal (NIG).

3. The device of claim 2, wherein the time delay part includes:
    a voltage distribution circuit configured to distribute the output voltage output from the manual control signal generator; and
    a time constant circuit configured to delay output of the voltage distribution circuit for the predetermined time.

4. An automatic power supply control method of a battery management system (BMS) that automatically controls power supplied from a battery to a load, the method comprising:
    generating, by a user's switching, a manual control signal (IGON);
    waking, by the manual control signal (IGON), the converter up and generating power needed for a load using power of a battery;

generating, by a controller (MCU), which is driven by the power generated by the converter, of the BMS, a signal (MWAKEUP) for controlling driving of the converter;
inactivating the signal (IGON) among the signal (IGON) and the signal (MWAKEUP) input to the converter; and
controlling, by the controller configured to control the signal (MWAKEUP), the driving of the converter.

5. The method of claim 4, further comprising:
receiving, by the controller, information about a remaining charge amount of the battery from a remaining battery amount sensor configured to detect the remaining charge amount of the battery; and
controlling, by the controller, the driving of the converter using the information about the remaining charge amount of the battery.

* * * * *